Nov. 13, 1956 A. G. EDMISTON 2,770,267
ALL PURPOSE SAW BLADE
Filed Jan. 5, 1954 2 Sheets-Sheet 1
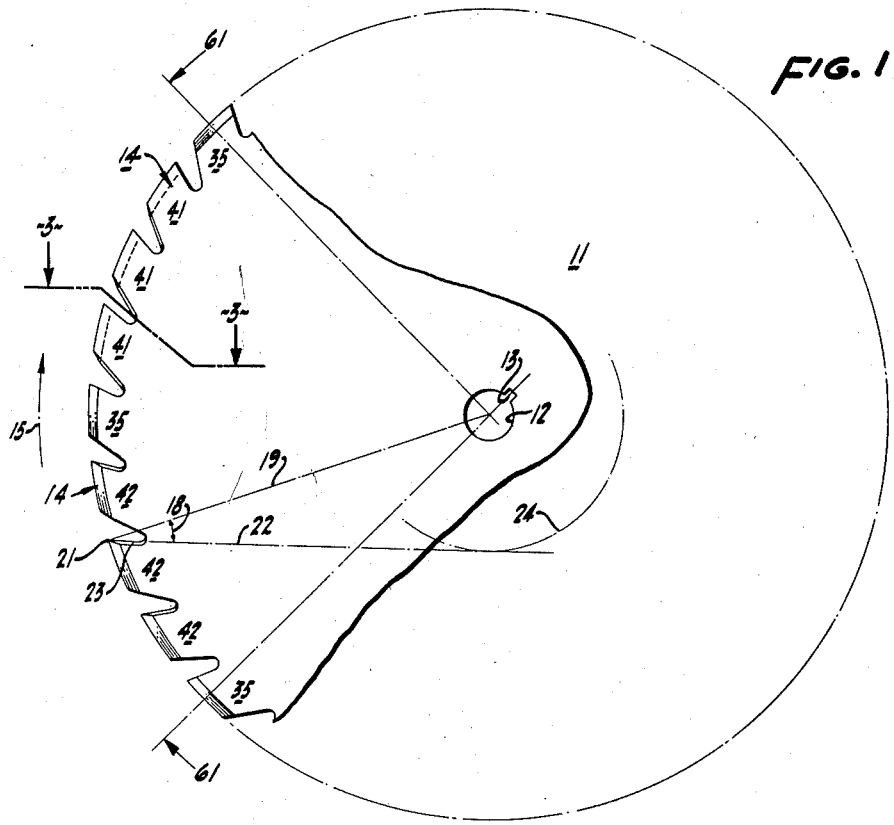
FIG. 1
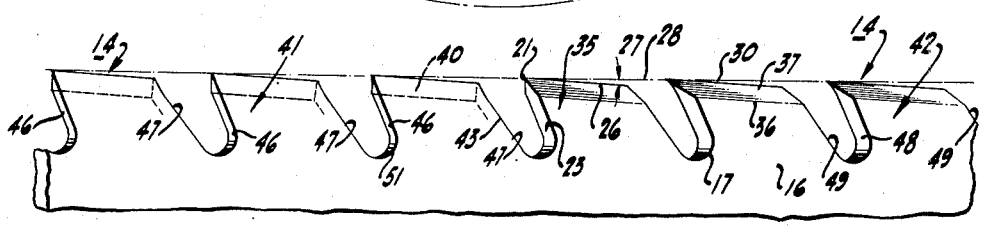
FIG. 2
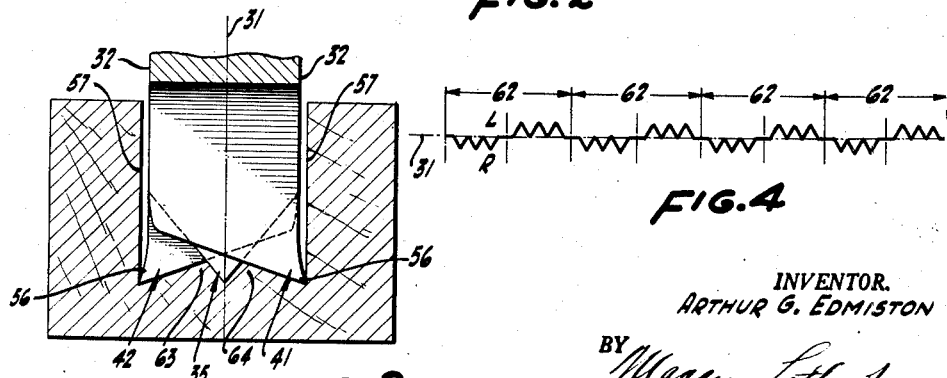
FIG. 3
FIG. 4
INVENTOR.
ARTHUR G. EDMISTON
BY
ATTORNEY Nov. 13, 1956  A. G. EDMISTON  2,770,267
ALL PURPOSE SAW BLADE
Filed Jan. 5, 1954  2 Sheets-Sheet 2

INVENTOR.
ARTHUR G. EDMISTON
BY Marcus Lothrop
ATTORNEY

United States Patent Office 2,770,267
Patented Nov. 13, 1956

2,770,267

ALL PURPOSE SAW BLADE

Arthur G. Edmiston, Sacramento, Calif.

Application January 5, 1954, Serial No. 402,325

1 Claim. (Cl. 143—133)

My invention relates to improvements in saw blades and particularly to saw blades of the kind suitable for both ripping and cutting off material.

Historically, saw blades have been divided into at least two classes, based upon the forms of teeth used in the blades. One of the classes comprises splitting or ripping blades; the other, cut-off blades. Ripping blades are designed especially to cut fibrous materials, such as wood, longitudinally or with the fibers. Cut-off saws, on the other hand, are differently shaped from ripping saws and are utilized to cut transversely or across the fibers or grain.

Still other classes of saws have been developed to cut newer materials, such as plastics, plasticized fibers and other fibrous materials.

It has heretofore been assumed that for a particular type of cutting operation and a particular kind of material, the operator must use a saw blade only within one of the accepted classifications in order best to effect the cutting operations. Where numerous kinds of materials and types of cuts are encountered, however, such as in a hobby shop or by a home craftsman, the necessity of changing to different blades becomes an unwelcomed chore and an expensive undertaking.

It is therefore an object of my invention to provide a saw blade which can be efficiently utilized for cutting not only materials such as woods of all kinds, but also plastics and fibers of all presently known types as well.

It is another object of my invention to provide a saw blade which cuts as smoothly in the longitudinal direction of a piece of material as in the transverse direction thereof.

It is a further obejct of my invention to provide a saw blade which is capable of safely cutting a greater variety of materials and at a faster speed than existing saw blades of comparable size.

A further object of the invention is to provide a saw blade which is easily sharpened even by ordinary hand tools.

A still further object of the invention is to provide a saw blade which cuts not only more rapidly than existing blades of comparable size, but more efficiently as well, and with less tooth chatter and vibration than in other present day types of saw blades.

Another object of the invention is to provide a generally improved all-purpose saw blade.

Other objects, together with the foregoing, are obtained in the embodiment of the invention described in the accompanying description and illustrated in the accompanying drawings, in which:

Figure 1 is a side elevation of one form of the saw blade of my invention, a portion only of the teeth being shown and illustrating one complete tooth bevel pattern, the balance of the teeth being represented by circles in outline of rim diameter and teeth root diameter.

Figure 2 is a perspective of a portion of the teeth illustrated in Figure 1, the curvilinear teeth rim and root being developed to a linear representation to reduce the extent of the figure.

Figure 3 is a section taken along the plane indicated by the line 3—3 of Figure 1 and showing three successive left-hand beveled, center beveled and right-hand beveled teeth cutting a block of wood.

Figure 4 is a schematic representation of a plurality of tooth bevel patterns of the saw blade shown in Figure 1.

Figure 5:
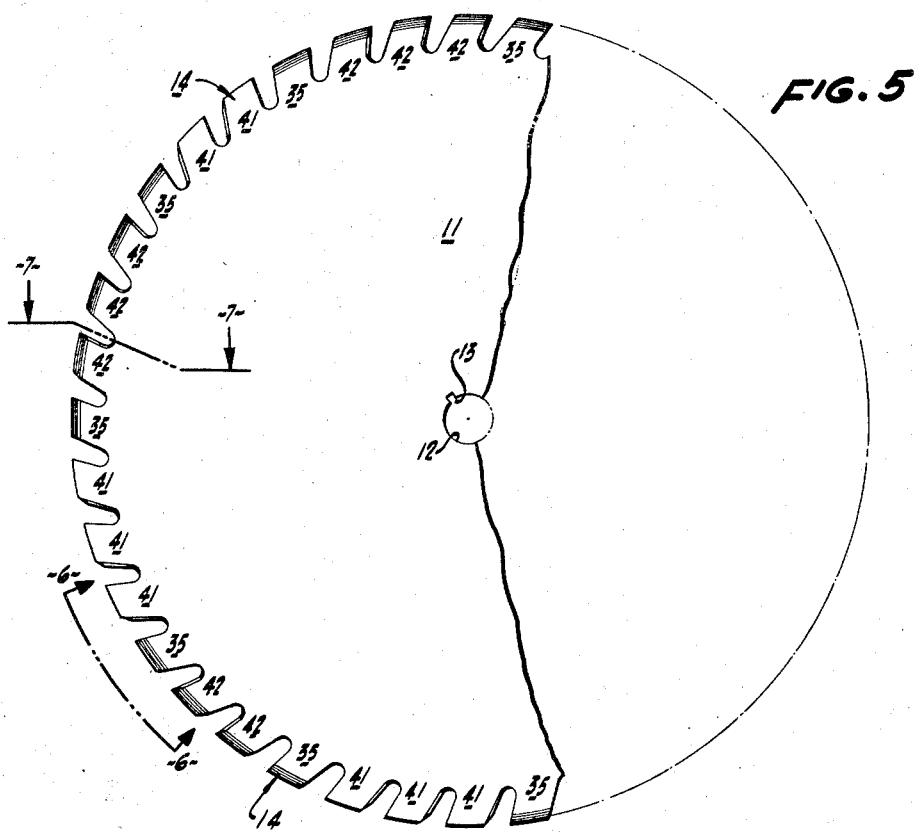
Figure 5 is a side elevation of another form of the saw blade of my invention, a portion only of the teeth being shown and illustrating one complete tooth bevel pattern, the balance of the teeth being represented by circles, in outline, of rim diameter and teeth root diameter.

In the saw blade of my invention a circular disk 11 or plate is provided with a center hole 12 or eye and keyway 13, for example, to fit the blade securely to an arbor, mandrel or other rotatable member (not shown).

Formed around the periphery of the plate is a plurality of teeth 14 inclining forwardly in the direction of rotation of the blade as shown by the arrow 15. The number of teeth formed in the blade depends upon several factors including the tangential or rim speed of the saw, the kind of material to be cut and the bevel pattern of the teeth. For cutting a wide variety of materials around a shop, mill, construction job or home, I have found that the use of approximately three to five teeth for each inch of saw blade diameter is very satisfactory.

The form of the teeth is perhaps the most important single feature in a saw blade. I therefore provide teeth each having a wide base 16 for strength yet smoothly faired around each gullet 17 to avoid vibrational or chatter cracks and to discharge sawdust freely.

The teeth of the usual cut-off or cross-cut saw have very little, if any, forward inclination or hook; the customary ripping or splitting saw, on the other hand, utilizes a substantial hook. The hook angle 18, as clearly appears in Figure 1, is the angle between the pitch line 19, an imaginary line joining the top or outermost leading tip 21 of a tooth with the saw center, and the hook line 22, an imaginary extension of the front face 23 of the tooth.

The saw blade of my invention is useful not only for cross-cutting but for ripping as well; and a very satisfactory result is obtained in making both types of cuts by forming the front face of the teeth 14 to a shape wherein the hook line 22 is tangent to a circle 24 having a diameter approximately one-third the diameter of the saw blade.

In order to reduce friction, I prefer to file the top margin 26 of each of the teeth to a top angle 27, as shown in Figure 2, the top angle being the angle included between the line 28 tangent to the leading outermost tip 21 of the tooth and the line along the top margin 26 of the tooth.

The top margin 26 of the teeth is not in every instance within a plane or center-line 31 (most clearly shown in Figures 3, 6 and 7) passing downwardly through the middle of the disk and parallel to the side 32 of the disk. In certain predetermined teeth, the tops or top faces of the teeth are filed on both sides of the tooth center-line to form a center beveled tooth 35, in which case the top margin 26 does fall substantially within the central plane 31.

In other predetermined teeth, however, the top faces are beveled on one side only so that the top face slopes from a top margin 30, disposed on one side of the plane 31, downwardly toward a bottom margin 36, disposed on the other side of the plane 31, to form on the top surface of the teeth a top bevel 37. Similarly, in certain other predetermined teeth, the top bevels 40 are sloped toward the other direction but at the same number of degrees of top bevel. Figure 3 very clearly shows the three types of bevels.

As appears most clearly in Figure 2, in the first three teeth at the left, the top bevels 40 face in a direction away from the observer and these teeth are termed, for convenience, left-hand beveled teeth 41. The next tooth is illustrative of the center beveled type of tooth 35, while the last two teeth are beveled on the side toward the observer, and are conveniently termed right-hand beveled teeth 42.

For greater cutting efficiency and free discharge of sawdust, I prefer to bevel the leading or front faces 23 of the right-hand and left-hand beveled teeth.

Figure 6:
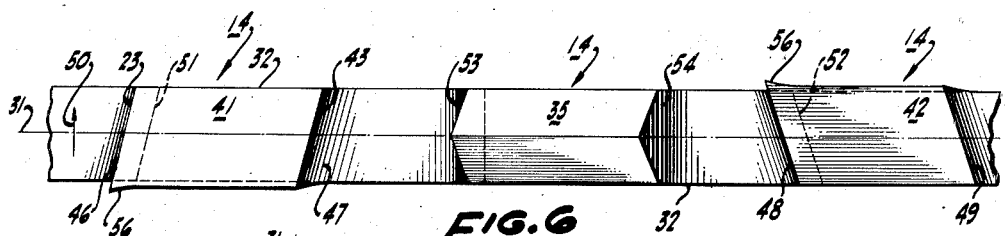
Figure 6 is an end view of three of the teeth shown in Figure 5, the curvilinear teeth arrangement being developed to linear representation as indicated by the line 6—6 of Figure 5.

As appears most clearly in Figures 2 and 6, the front faces of the left-hand beveled teeth 41, as well as the rear faces 43 thereof, are filed so as to form a left-hand front bevel 46 and rear bevel 47. Quite comparably, the front and rear faces of the right-hand beveled teeth 42 are filed to form a right-hand front bevel 48 and rear bevel 49, respectively. It is to be noted that the front bevel in each case is carried well down into the gullet, as appears from the dotted lines 51 and 52, respectively, in Figure 6 and also as shown in Figure 2.

By way of contrast, the front and rear faces 53 and 54, respectively, of the center-beveled teeth 35, are not beveled. Instead, the center beveled teeth are dressed squarely across their faces. Front bevels tend to divide or wedge apart the fibers, if any, in the material, whereas a squarely dressed tooth provides a shearing effect, cutting the material off squarely. By combining both types of cutting faces, the saw blade of my invention effects a smooth cut in either longitudinal or transverse direction.

Along the outermost margin of the beveled teeth, of both the right-hand and the left-hand type, the outermost margins of the teeth are slightly sprung or bent over laterally to form a set 56 or overhanging portion producing a kerf 57 or slot in the material slightly wider than the thickness of the saw disk to prevent frictional interference or binding of the blade in the cut. No set is given to the center-beveled teeth.

The combination of a predetermined number and location of oppositely directed front bevels with a predetermined number and location of teeth having square faces not only provides the combined wedging apart and shearing effort resulting in clean cuts in both a longitudinal and transverse direction, but such predetermined arrangement also reduces chattering or vibration of the blade, thus permitting higher rim speed and reduced tooth cracks and breaks. As can be seen by reference to Figure 6, in the case of a tooth having a front bevel, as, for example, the left-hand front bevel 46, the tooth bevel in forcing its way through the material provides a lateral component tending to force the material being cut in a lateral or upward direction as indicated by the arrow 50 in Figure 6. An oppositely directed reacting force tends to force the tooth laterally or downwardly (as appears in Figure 6) with respect to the center plane 31. Resisting this lateral displacement is the inherent resilience of the tooth. The result of these counteracting forces is lateral tooth vibration or tooth chatter in saws of the customary kind. To overcome this undersirable situation, the usual saw blades must be run at a slower speed and in many cases saw manufacturers have even foregone the beveling of the front face, despite the superior ability of beveled teeth to wedge apart or divide or split the material, and have resorted to teeth which are all squarely dressed.

In the saw blade of my invention, I have retained all of the advantages of both squarely dressed and beveled front faces without incurring the disadvantages thereof. I have accomplished this by my unique arrangements or patterns of left-hand, right-hand and center-beveled teeth top surfaces, accompanied by the corresponding front beveling and square dressing of the teeth faces.

In Figure 1, a one quarter portion of all the saw teeth is illustrated, the sector being bounded by the radii designated by the numerals 61. The top tooth shown in Figure 1 is a tooth of the center-beveled type 35, having a squarely dressed front bevel. Proceeding downwardly, the next three teeth are beveled on the top, on the side of the plate away from the observer and are termed, for convenience, left-hand beveled teeth 41, having a corresponding left-hand front bevel, as shown in Figure 6. The next is a tooth of the center-beveled kind 35. The subsequent three teeth are termed, for convenience, right-hand beveled teeth 42, and are beveled on the side facing the observer. The foregoing eight teeth, in the order stated, comprise the tooth pattern of the form of my invention illustrated in Figure 1. The last tooth shown, beveled on both sides of the top surface, commences the next pattern.

The number of teeth patterns used on any particular blade depends on the total number of teeth on the blade. Preferably, the number of teeth on the blade should be a multiple of the number of teeth comprising the pattern. In the blade shown in Figure 1, four complete patterns of eight teeth per pattern could conveniently be formed. In Figure 4, the pattern, designated 62, is shown repeated four times, the center-beveled teeth being shown as a short line along the center-line or plane 31, with each of the left-hand beveled teeth being schematically represented by an upwardly pointing triangle in the direction indicated by the letter L, and each of the right-hand beveled teeth by a downwardly pointing triangle in the direction indicated by the letter R.

Figure 3 clearly illustrates how the three different kinds of teeth cooperate to break the material into three chips or portions. Each tooth type does only a part of the work, thus each tooth is not required to exert full cutting force on the material facing it. In Figure 3, the tooth nearest the observer is a tooth of the left-hand bevel type 41. The combination of top bevel and front or face bevel results in substantially all cutting effort being exerted by the triangular portion of the tooth in which the numeral 41 is placed. Accordingly, only that part of the material against which the triangular portion of the tooth bears is sliced or split.

Following or behind the tooth 41 is shown a tooth 35 beveled on both sides. Again, only a relatively small part of the total tooth area is required to exert the shearing effort effected by the squarely dressed tooth 35. A correspondingly small chip is sheared from its matrix.

The centrally-beveled tooth 35 is in turn followed by a right-hand beveled tooth 42, acting in a manner quite similar to the left-hand beveled tooth 41 but in an opposed direction of bevel and on the other side of the kerf 57.

It can thus be seen that while each tooth need cut only a fractional part of the material, the three teeth in combination will effectively remove all of the desired amount. The small amount of material remaining in the low ridges 63 and 64 is removed as the saw progresses farther into the material.

The beneficial results obtainable from the foregoing combination include greater rim speed and reduced power requirement, owing to the reduction in the amount of frictional resistance.

Utilization of the tooth pattern 61 shown in Figures 1 and 4, in conjunction with the tooth forms, contributes to an even greater cutting efficiency and smoothness of kerf than if the tooth forms described were used only in simple alternations. The pattern starts with a squarely dressed, centrally-beveled tooth, to provide a clean centrally disposed shearing type of cut. This initial cut is immediately followed, in rapid succession, by not one but three top and front beveled teeth, slitting the material on one side of the existing center cut, effecting a smoothly sliced face on the side of the kerf and removing the material on that side of the center cut except for the ridge 64 shown in Figure 3. The three teeth cooperate to remove a substantial amount of material on their side of the kerf and experience has shown that less chatter and vibration and tooth breakage results from this plurality of similarly beveled teeth in succession, particularly in fibrous material. It is believed that each tooth conditions the material, perhaps by urging the fibers into a uniform attitude, and making it easier for the following similarly disposed teeth to effect their cuts.

The three similarly beveled teeth are then followed by another center-beveled tooth, chipping the material in the middle of the kerf slot. This, in turn, is followed by three teeth, beveled so as to cut away the material on the other side of the slot and thus producing on that side a clean walled kerf and accordingly, a smooth cut.

It has been found that this tooth pattern is so effective in cutting even fibrous or grainy material, such as wood, that a cut made in any direction on a piece, say, of one inch 7-ply plywood, an especially difficult material on which to obtain a smooth edge, will result in an edge having almost a sanded appearance, with only a faint suggestion of any fuzziness or loose grains in the several transverse plies, and a very smooth surface indeed on the longitudinally disposed ply members.

Excellent cutting performance has also been obtained from the saw blade of a modified form of my invention and illustrated in Figure 5. The tooth forms of this blade are substantially identical with those heretofore described in connection with the blade shown in Figure 1 and thus a description of the tooth form of one serves equally to describe the tooth form of the other.

Figures 7, 8:
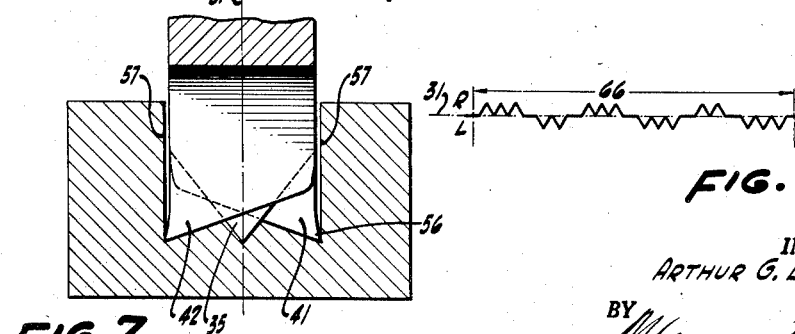
Figure 7 is a section along the plane indicated by the line 7—7 of Figure 5 and showing three successive right-hand beveled, center beveled and left-hand beveled teeth cutting a piece of material.
Figure 8 is a schematic representation of the tooth bevel pattern illustrated in Figure 5.

The main difference between the two forms of blades lies in the bevel pattern of the teeth. As clearly appears in Figure 5 and in the schematic representation of the modified bevel pattern 66, as shown in Figure 8, the tooth sequence in the modified form of blade is somewhat the more complicated of the two. In the modified form, the first tooth is centrally-beveled. This is followed in the particular blade here represented by three right-hand beveled teeth, then by a central bevel, and in turn, by two left-hand bevels, one center, three right-hand, one center, three left, one center, two right, one center, and concluding with three left-hand bevels. This pattern is clearly shown, schematically, by Figure 8, and reference to Figure 8 discloses that the pattern comprises six central-bevels, eight right bevels and eight left bevels, a total of twenty-two teeth in the pattern. The beveled teeth of one type are equal in number to the beveled teeth of the opposite type; this equality balances out within each pattern any lateral thrust of the teeth caused by the fact that in several instances throughout the pattern two teeth follow three teeth and three teeth follow two teeth.

In practice, it has been found that saw blades utilizing the modified pattern can be run as at high, and in some instances higher, rim speed and feed than the pattern first described. Owing to the shortened groups, there is a somewhat faster alternation of the teeth groups from one side of the kerf to the other in the modified form and thus the length of the channel excavated on each side by each group is not so extensive and permits of higher rim speed. In both forms of the saw blade of my invention, however, the quality of workmanship and the speed and efficiency obtainable substantially exceed anything presently existing in the circular saw field.

What is claimed is:

A saw blade comprising a circular plate of predetermined diameter adapted to be mounted on a rotatable saw arbor, and a plurality of teeth each having substantially identical root and marginal dimensions and being separated by a gullet of substantially uniform size, each of said teeth having a root dimension greater in extent than the height thereof and inclining forwardly in the direction of rotation of said blade to form a hook angle defined by the pitch line of said tooth and a hook line tangent with an imaginary circle having a diameter substantially one-third said predetermined diameter, said plurality of teeth being disposed in a series of recurring groups, each group comprising a first set of three teeth each having its front edge and upper margin beveled toward one side of said blade, and a second set of three teeth each having its front edge and upper margin beveled toward the other side of said blade, said first and second sets being separated by a square-faced single tooth beveled equally on its upper margin toward each side of said blade to present a centrally disposed triangular outline over its cutting area, said first set of three teeth having an overhang toward said one side of said blade and said second set of three teeth having an overhang toward said other side of said blade.

References Cited in the file of this patent

UNITED STATES PATENTS

| | | |
|---|---|---|
| 180,986 | Boynton | Aug. 15, 1876 |
| 388,305 | Ralya et al. | Aug. 21, 1888 |
| 627,113 | Guedel | June 20, 1899 |
| 1,240,939 | Carlson | Sept. 25, 1917 |
| 1,421,520 | Mattson | July 4, 1922 |
| 1,689,618 | Brown | Oct. 30, 1928 |
| 2,703,593 | Weller | Mar. 8, 1955 |